US012692460B2

(12) United States Patent
Muralidharan et al.

(10) Patent No.: US 12,692,460 B2
(45) Date of Patent: Jul. 28, 2026

(54) UNIT DOSE TABLET COMPOSITION

(71) Applicant: CONOPCO, INC., Englewood Cliffs, NJ (US)

(72) Inventors: Girish Muralidharan, Banashankari (IN); Rajeesh Kumar Ramachandran, Hosur (IN)

(73) Assignee: CONOPCO, INC., Englewood Cliffs, NJ (US)

( * ) Notice: Subject to any disclaimer, the term of this patent is extended or adjusted under 35 U.S.C. 154(b) by 240 days.

(21) Appl. No.: 18/561,567

(22) PCT Filed: Jun. 10, 2022

(86) PCT No.: PCT/EP2022/065912
§ 371 (c)(1),
(2) Date: Nov. 16, 2023

(87) PCT Pub. No.: WO2022/263332
PCT Pub. Date: Dec. 22, 2022

(65) Prior Publication Data

US 2024/0158721 A1 May 16, 2024

(30) Foreign Application Priority Data

Jun. 15, 2021 (EP) .................................... 21179498

(51) Int. Cl.

| | |
|---|---|
| ***C11D 1/00*** | (2006.01) |
| ***B08B 3/04*** | (2006.01) |
| ***C11D 3/00*** | (2006.01) |
| ***C11D 3/10*** | (2006.01) |
| ***C11D 3/20*** | (2006.01) |
| ***C11D 17/00*** | (2006.01) |

(52) U.S. Cl.
CPC .............. *C11D 3/0052* (2013.01); *C11D 3/10* (2013.01); *C11D 3/2082* (2013.01); *C11D 3/2093* (2013.01); *C11D 17/0039* (2013.01); *C11D 17/0073* (2013.01)

(58) Field of Classification Search
CPC ......... C11D 1/00; C11D 3/0052; C11D 3/042; C11D 3/10; C11D 3/2075; C11D 3/2082; C11D 3/2086; C11D 17/0039; C11D 17/0073; B08B 3/04
See application file for complete search history.

(56) References Cited

U.S. PATENT DOCUMENTS

| | | | |
|---|---|---|---|
| 4,013,581 | A | 3/1977 | Huber |
| 2002/0155976 | A1 | 10/2002 | Boskamp et al. |
| 2007/0111918 | A1 | 5/2007 | Caswell et al. |
| 2008/0135062 | A1 | 6/2008 | Hibbard |
| 2012/0190608 | A1 | 7/2012 | Heppert et al. |
| 2018/0105766 | A1 | 4/2018 | Caparrós Casco |

FOREIGN PATENT DOCUMENTS

| | | | | |
|---|---|---|---|---|
| DE | 19843938 A1 | 3/2000 | |
| EP | 0651052 A1 | 5/1995 | |
| GB | 2339575 A | 2/2000 | |
| GB | 2375543 * | 11/2002 | ............ C11D 17/00 |
| GB | 2375543 A | 11/2002 | |
| WO | 9512657 A1 | 5/1995 | |
| WO | WO 95/12657 * | 5/1995 | ............... C11D 7/08 |
| WO | 9731096 A1 | 8/1997 | |
| WO | 0043488 A1 | 7/2000 | |

OTHER PUBLICATIONS

European Search Report and Written Opinion issued in European Patent Application No. EP21179498 dated Dec. 13, 2021.
International Preliminary Report on Patentability issued in International Patent Application No. PCT/EP2022/065912 Dec. 14, 2023.
International Search Report issued in International Patent Application No. PCT/EP2022/065912 dated Sep. 21, 2022.
Notice of Opposition dated Jul. 11, 2025 issued in European Application No. 22733401.8 (17 pages).
Hauthal et al., "Household Cleaning, Care and Maintenance Products", Chemistry, Application, Ecology and Consumer Safety, Verlag fur chemische Industrie, Sep. 2004 (3 pages).

* cited by examiner

*Primary Examiner* — Brian P Mruk
(74) *Attorney, Agent, or Firm* — Carter, DeLuca & Farrell, LLP; George Likourezos; Bret P. Shapiro

(57) ABSTRACT

A unit-dose tablet composition comprising a surfactant, a builder, a filler and an effervescent agent selected from organic acids wherein at least 90% wt. of the effervescent agent is coated with triglyceride oil.

11 Claims, No Drawings

UNIT DOSE TABLET COMPOSITION

CROSS-REFERENCE TO RELATED APPLICATIONS

The application claims priority to PCT/EP2022/065912, filed Jun. 10, 2022, entitled "A UNIT DOSE TABLET COMPOSITION," which claims priority to European Patent Application No. EP21179498.7, filed Jun. 15, 2021; the entire contents of these applications are incorporated herein by reference.

The present invention relates to unit dose tablet compositions. The invention further relates to a process for making such compositions, and methods of treating surfaces with such compositions.

Unit dose cleaning compositions such as detergent tablets are one of the most consumer preferred products, due to ease of handling, dosage and storage. Such compositions are used to clean surfaces, such as bathroom surfaces, kitchen surfaces as well as to clean laundry surfaces.

There have been many attempts to formulate unit dose tablet compositions which are resistant to breakage (to withstand transport, accidental drop etc.) yet dissolve quickly. However, a dichotomy exists in that as compression force is increased in an attempt to provide a composition that is resistant to breakage, the rate of dissolution of the tablets becomes slower. A low compression force, on the other hand, improves dissolution but at the expense of tablet strength. This problem is compounded by the fact that conventional tablet compositions have relatively poor long-term storage-stability characteristics and, to compensate, have to be manufactured to a higher compression specification.

Attempts to provide unit dose cleaning composition with acceptable strength and dissolvability have been described in the prior art. For example, WO 2000/43488A1 discloses a detergent tablet for use in a washing machine, the tablet having one or more phases at least one of which is in the form of a compressed particulate solid comprising: a) a polymeric disintegrant having a particle size distribution such that at least 90% by weight thereof has a particle size below about 0.3 mm and at least 30% by weight thereof has a particle size below about 0.2 mm; and b) a water-soluble hydrated salt having a solubility in distilled water of at least about 25 g/100 g at 25° C.

However, the detergent tablets of WO0043488A1 still suffer from poor dissolvability when added to a bowl of water meaning that the detergent tablets do not meet consumer expectations, in particular in washing laundry.

GB 2 339 575 A (PROCTER & GAMBLE) discloses cellulose disintegrant for detergent compositions.

DE 198 43 938 A1 (HENKEL KGAA) discloses washing and cleaning agent shaped bodies which, as preparation components, contain substances selected from the group of alkali sulfates and/or alkaline-earth sulfates and/or alkaline-earth carbonates and/or alkaline-earth phosphates and/or alkaline-earth citrates. These shaped bodies are said to comprise advantageous properties with regard to application techniques if at least 60 weight percent of the designated alkali salts and/or alkaline-earth salts comprise particle sizes greater than 600 micrometers.

US 2002/155976 A1 (BOSKAMP JELLES VINCENT ET AL) discloses a tablet of compacted particulate detergent composition comprising non-soap surfactant and detergency builder, and; a) disintegration-promoting particles comprising water-insoluble disintegrant which can swell to at least twice its volume on contact with water, and a water-absorbent carrier which so swells to a lesser extent, and b) water-soluble polymeric binder solid at 25 degrees centigrade, and either c) comprising 2 to 30 percent wt. of water-soluble disintegration-promoting particles comprising at least 40 percent of materials selected from; compounds with water solubility at 20 degrees centigrade of at least 50 grams per 100 grams of water phase I sodium tripolyphosphate sodium tripolyphosphate that contains water of hydration in an amount which is at least 0.5 percent wt. of the sodium tripolyphosphate in the particles, or d) having a diametral fracture stress of at least 14 kPa. The tablets are said to exhibit good disintegration properties.

US 2008/135062 A1 (HIBBARD LOU D) discloses a disinfecting tablet is disclosed having rapid disintegration and low friability. In one embodiment, the disinfecting tablet comprises sodium dichloroisocyanurate dihydrate and at least one swellable disintegrating agent assisting with rapid disintegration of the tablet. Also disclosed are a disinfecting cleaning tool assembly and a method of cleaning.

U.S. Pat. No. 4,013,581 A (HUBER ARTHUR ELMER) discloses peroxygen bleaches, especially diperazelaic acid, are provided in tablet form useful for bleaching fabrics.

It is therefore an object of the invention to provide unit dose tablet compositions having improved dissolution characteristics and which at the same time delivers excellent storage stability in terms of strength.

Accordingly, and in a first aspect, there is provided a unit-dose tablet composition comprising a surfactant, a builder, a filler and an effervescent agent selected from organic acids wherein at least 90% wt. of the effervescent agent is coated with triglyceride oil.

In a second aspect the present invention provides a method of cleaning a surface comprising the step of dissolving a unit-dose tablet composition as defined herein in water to provide a solution of the cleaning composition, and contacting the surface with the cleaning composition, preferably wherein the surface is a hard surface, a soft surface or a laundry surface.

In a third aspect the present invention provides a use of a unit-dose tablet composition as defined herein for cleaning a surface, preferably wherein the surface is a hard surface, a soft surface or a laundry surface.

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

Effervescent Agent

The composition comprises an effervescent agent. The effervescent agent selected form organic acids wherein at least 90% wt. of the effervescent agent is coated with triglyceride oil.

Suitable effervescent agents include organic acids such as citric acid, tartaric acid, fumaric acid, malic acid, adipic acid, succinic acid. Preferably at least 90% wt. of the organic acid is coated with triglyceride oil. Most preferably, the effervescent agent is citric acid.

The level of effervescent agent is from 1 to 20% wt. of the composition, more preferably from 2 to 10% wt. of the composition.

Preferably, the triglyceride oil comprises from 5 to 35% wt. of the coated effervescent agent.

Preferably the composition further comprises an effervescent selected from carbonate salts. Preferred carbonate salts include sodium carbonate, potassium carbonate, calcium carbonate, sodium bicarbonate, potassium bicarbonate, calcium carbonate, calcium bicarbonate and magnesium carbonate as well as mixtures thereof.

Surfactant

Typically, the unit-dose tablet composition comprises 1 to 80 wt. % surfactant system selected from anionic surfactants, cationic surfactants, non-ionic surfactants, amphoteric surfactants.

The unit dose tablet composition of the invention preferably comprises an anionic surfactant or a mixture of anionic surfactants. Anionic surfactants are included in the composition for primary cleaning action by emulsifying the oil attached to the substrate. Any non-soap anionic surfactant known in the art for use in laundry detergents may be used herein. In general, these surfactants are described in well-known textbooks like "Surface Active Agents" Vol. 1, by Schwartz & Perry, Interscience 1949, Vol. 2 by Schwartz, Perry & Berch, Interscience 1958, and/or the current edition of "McCutcheon's Emulsifiers and Detergents" published by Manufacturing Confectioners Company or in "Tenside-Taschenbuch", H. Stache, 2nd Edn., Carl Hauser Verlag, 1981.

A suitable class of anionic surfactants are water-soluble salts, particularly alkali metal (eg. sodium or potassium), ammonium and alkylolammonium salts of organic sulphuric acid monoesters and sulphonic acids having in the molecular structure a branched or straight chain alkyl group and condensations products thereof containing 8 to 22 carbon atoms or an alkylaryl group containing 6 to 20 carbon atoms in the alkyl part.

Preferred anionic surfactants include higher alkyl aromatic sulphonates such as higher alkyl benzene sulphonates containing from 6 to 20 carbon atoms in the alkyl group in a straight or branched chain, particular examples of which are higher alkyl benzene sulphonates or of higher-alkyl toluene, xylene or phenol sulphonates, alkyl naphthalene sulphonates, diamyl naphthalene sulphonate, and dinonyl naphthalene sulphonate; alkyl sulphates containing 8 to 22 carbon atoms and alkyl ether sulphates containing from 1 to 10 ethylene oxide or propylene oxide, preferably 2 to 3 ethylene oxide units per molecule.

Non-limiting examples of the anionic surfactants include any of the common anionic surfactants such as linear or modified, e. g. branched alkylbenzene sulphonates, alkylpoly(ethoxylates), sodium lauryl ether sulphates, methyl ester sulphonates, primary alkyl sulphates or mixtures thereof.

The non-soap anionic surfactant is present in the detergent composition in a concentration of 5 to 60%, preferably not less than 10%, more preferably not less than 12%, still more preferably not less than 15% but typically not more than 40%, preferably not more than 35% or even not more than 30% by weight of the total composition.

Anionic surfactant of the present invention may be combined with another surfactant generally chosen from non-ionic, cationic, amphoteric or zwitterionic surfactants.

In view of the anionic character of the anionic surfactant, cationic, amphoteric or zwitterionic surfactants when added are added at concentrations that do not hinder the performance of the composition.

Suitable non-ionic surfactants include water soluble aliphatic ethoxylated nonionic surfactants commercially known, including the primary aliphatic alcohol ethoxylates and secondary aliphatic alcohol ethoxylates. This includes the condensation products of a higher alcohol (e.g., an alkanol containing about 8 to 16 carbon atoms in a straight or branched chain configuration) condensed with about 4 to 20 moles of ethylene oxide, for example, lauryl or myristyl alcohol condensed with about 10 moles of ethylene oxide (EO), tridecanol condensed with about 6 to 15 moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

Examples of the foregoing non-ionic surfactants include, but are not limited to, the Neodol (trade mark, ex Shell) ethoxylates, which are higher aliphatic, primary alcohol containing about 9 to 15 carbon atoms, such as C9 to C11 alkanol condensed with 4 to 10 moles of ethylene oxide (Neodol 91-8 or Neodol 91-5), C12-13 alkanol condensed with 6.5 moles ethylene oxide (Neodol 23-6.5), C12-15 alkanol condensed with 12 moles ethylene oxide (Neodol 25-12), C14-15 alkanol condensed with 13 moles ethylene oxide (Neodol 45-13), and the like. Such ethoxamers have an HLB (hydrophobic lipophilic balance) value of about 8 to 15 and give good O/W emulsification, whereas ethoxamers with HLB values below 7 contain less than 4 ethyleneoxide groups and tend to be poor emulsifiers and poor detergents.

Suitable amphoteric surfactants include derivatives of aliphatic secondary and tertiary amines containing an alkyl group of 8 to 18 carbon atoms and an aliphatic radical substituted by an anionic water-solubilizing group, such as sodium 3-dodecylamino-propionate, sodium 3-dodecylaminopropane sulphonate and sodium N-2-hydroxydodecyl-N-methyltaurate.

Suitable cationic surfactants are quaternary ammonium salts according to the present invention are quaternary ammonium salts characterised in that the ammonium salt has the general formula: R1R2R3R4N+X— wherein R1 is a C12 to C18 alkyl group, each of R2, R3 and R4 independently is a C1 to C3 alkyl group and X is an inorganic anion. R1 is preferably a C14 to C16 straight chain alkyl group, more preferably C16. R2, R3 and R4 are preferably methyl groups. The inorganic anion (X—) is preferably chosen from halide, sulphate, bisulphate or hydroxide.

For the purposes of this invention, a quaternary ammonium hydroxide is considered to be a quaternary ammonium salt. More preferably the anion is a halide ion or sulphate, most preferably a chloride or sulphate. Cetyl-trimethylammonium chloride is a specific example of a suitable compound and commercially abundantly available.

Another type of quaternary ammonium cationic surfactant is the class of benzalkonium halides, also known as alkyldimethylbenzylammonium halides. The most common type being benzalkonium chloride, also known as alkyldimethylbenzylammonium chloride (or ADBAC).

Suitable zwitterionic surfactants include derivatives of aliphatic quaternary ammonium, sulphonium and phosphonium compounds having an aliphatic radical of from 8 to 18 carbon atoms and an aliphatic radical substituted by an anionic water-solubilising group, for instance 3-(N—N-dimethyl-N-hexadecylammonium) propane-1-sulphonate betaine, 3-(dodecylmethyl sulphonium) propane-1-sulphonate betaine and 3-(cetylmethylphosphonium) ethane sulphonate betaine.

Preferably, the surfactant comprises from 2 to 70% wt. of the composition.

Disintegrants

The unit dose tablet composition preferably comprises a swellable disintegrant and/or a non-swellable disintegrant. A swellable disintegrant is one which has a water absorption ratio (WAR) of greater than 1 and a non-water swellable disintegrant is one which has a water absorption ratio of less than 1.

Water Absorption Ratio is a measure as to how much water a material absorbs under controlled and defined conditions. The process described in ASTM D570 is used in this application.

Preferable the swellable disintegrant is selected from microcrystalline cellulose, sodium starch glycolate and mixtures thereof. Preferably, the swellable disintegrant comprises from 1 to 20% wt. of the unit dose tablet composition, more preferably from 5 to 15% wt.

Preferably, the non-swellable disintegrant is selected from polyvinyl pyrrolidone, calcium silicate and mixtures thereof. Preferably, the non-swellable disintegrant comprises from 1 to 10% wt. of the unit dose tablet composition, more preferably from 2 to 5% wt.

Water Soluble Salt

Preferably, the composition comprises a water-soluble salt. More preferably, the salt has a solubility of at least 0.5 g/100 mL at 25° C., preferably at least 1 g/100 mL, more preferably at least 5 g/100 mL, and most preferably at least 10 g/100 mL at 25° C. Preferably, the water-soluble salt has a solubility of at most 75 g/100 mL, more preferably at most 70 g/100 mL at 25° C., even more preferably at most 60 g/100 mL.

In other words, the water-soluble salt has a solubility of in the range of 0.5 g/100 mL to 75 g/100 mL at 25° C., preferably 1 g/100 mL to 70 g/100 mL at 25° C., more preferably 5 g/100 mL to 65 g/100 mL at 25° C., even more preferably 10 g/100 mL to 60 g/100 mL.

The composition preferably comprises a water-soluble salt that is selected from anhydrous forms or hydrates of salts of mono or divalent alkali metals, preferably anhydrous forms or hydrates of salts of mono alkali metals, more preferably wherein the mono alkali metals is sodium or potassium.

Preferably, the anhydrous forms or hydrates of salts of mono alkali metals is selected from the group consisting of sodium chloride, sodium sulphate, sodium hydrogen carbonate, potassium chloride, potassium sulphate, potassium hydrogen carbonate and mixtures thereof.

The unit-dose tablet composition preferably comprises 0.1 to 20 wt. % water soluble salt, preferably 1 to 15 wt. %, more preferably 5 to 10 wt. %.

Filler

Typically, tablets comprise high amounts of filler however, we have found that this level may be significantly reduced thanks to the discovery that the claimed combination of disintegrants improve disintegration without such high levels of fillers.

The composition is also advantageous in that it requires less filler than typical tablet dose compositions.

Preferably, the unit dose tablet composition comprises no more than 15% filler, more preferably no more than 10% wt. and most preferably no more than 7% filler.

Preferably, the composition comprises some filler though and this should be at least 5% wt. of the composition.

Preferably, the filler comprises from 5 to 40% wt. of the composition.

Fillers suitable for use in the composition include calcium carbonate, zeolite, clays such as bentonite, dolomite and combinations thereof.

The unit-dose tablet composition is preferably a shaped solid, preferably the unit dose shaped solid is a tablet, lozenge, block or cube.

The composition may be used in washing machines, dishwashers, in toilet bowls, cisterns, water tanks, washing up bowls, surface cleaning and personal care applications.

The amounts and ingredients described above for the unit-dose tablet composition apply mutatis mutandis to the method of preparing the unit-dose tablet composition.

In a second aspect, the present invention relates to a method of cleaning a surface comprising the step of dissolving a unit-dose tablet composition as defined herein in water to provide a solution of the tablet composition and contacting a surface with the cleaning composition.

Preferably, the method of cleaning a surface comprising the step of dissolving a unit-dose tablet composition as defined herein in water, to provide a solution of the cleaning composition, and contacting a surface with the cleaning solution of the cleaning composition, preferably wherein the surface is a hard surface, a soft surface or a laundry surface.

The surface to be cleaned is preferably selected from the group of hard, soft and laundry surfaces.

Preferably, surface is a hard surface. The hard surface is preferably selected from a bathroom, kitchen or floor surface. Preferably the bathroom surface is selected from the group consisting of baths, toilet bowls, toilet cisterns, shower surfaces, floors and tiles. Preferably, the hard surface is a kitchen surface selected from the group of dishware, worktops, cooker tops, floors, ovens and sinks. The floor surface may be any stone, linoleum, tile, wood, laminate floor.

Preferably, the surface is a soft surface. Preferably the soft surface is selected from the skin and/or scalp. For example, the unit dose composition is preferably dissolved in a container of water for washing the body, hair etc. In other words, the unit dose compositions may be used for personal care applications.

Preferably, the surface is a laundry surface. The laundry surface is preferably any fabric surface to be laundered. A fabric surface is, for example, clothes, towels, linen, bedding etc.

Preferably, the method of cleaning a surface comprises the step of dissolving a unit-dose cleaning composition as defined herein in water to provide a solution of the cleaning composition and contacting a surface with the cleaning composition wherein the surface is a laundry surface.

Preferably, the unit-dose tablet composition is added to a container of water to be used in the cleaning of hard, soft and laundry surfaces.

Preferably the unit dose tablet composition is dosed in a bottle containing sufficient amount of water, thereby provides a cleaning composition in the bottle. The bottle may be equipped with a spray trigger or foaming engine. Thus, a consumer may dispense the cleaning composition directly on a surface as foam or spray.

Preferably, the unit-dose tablet composition is added to a washing machine or a container of water to be used in laundering of fabrics.

In a third aspect, the present invention relates to the use of a unit-dose tablet composition as defined herein for cleaning a surface, wherein the surface is a hard surface, a soft surface, or a laundry surface.

EXAMPLES

Unit-dose compositions were prepared according to Table 1. The water-soluble salt and disintegrant is post dosed to the remaining ingredients.

TABLE 1

| | A | B | C | D | E |
|---|---|---|---|---|---|
| Surfactant (LAS, SLES) | 22.9 | 22.9 | 22.9 | 22.9 | 22.9 |
| Sodium carbonate | 37.3 | 37.3 | 37.3 | 37.3 | 37.3 |
| Calcium carbonate | 10.7 | 10.7 | 10.7 | 10.7 | 10.7 |
| Sodium chloride | 7.5 | 7.5 | 7.5 | 7.5 | 7.5 |
| Citric acid anhydrous | 5 | | | | |
| Citric acid monohydrate | | 5 | | | |
| Citric acid coated with PEG 1000 (Acid 80%, and PEG 20%) | | | 5 | | |
| Citric acid coated with paraffin wax - (Acid 80%, and wax 20%) | | | | 5 | |
| Citric acid coated with triglyceride oil - (Acid 80%, and Triglyceride oil 20%) | | | | | 5 |
| Microcrystalline cellulose | 10 | 10 | 10 | 10 | 10 |
| Crosslinked PVP | 2.5 | 2.5 | 2.5 | 2.5 | 2.5 |
| Moisture/Minors | 4.1 | 4.1 | 4.1 | 4.1 | 4.1 |
| Tablet disintegration into powder in 1 minutes | YES | YES | NO | NO | YES |
| Tablet disintegration into powder in 1 minutes (after storage in HH* condition for 1 week) | NO | NO | NO | NO | YES |

*H&H condition herein refer to hot and humid storage condition, where a sample is stored at 40° C., 85% relative humidity.

The invention claimed is:

1. A unit-dose tablet composition comprising a surfactant, a builder, a filler and an effervescent agent selected from organic acids wherein at least 90% wt. of the effervescent agent is coated with triglyceride oil.

2. A unit dose tablet composition according to claim 1 wherein the effervescent agent is selected from citric acid, tartaric acid, fumaric acid, malic acid, adipic acid, succinic acid, and mixtures thereof.

3. A unit dose tablet composition according to claim 1, wherein the effervescent agent comprises from 1 to 20% wt. of the composition.

4. A unit dose tablet composition according to claim 1, wherein the filler comprises from 5 to 40% wt. of the composition.

5. A unit dose tablet composition according to claim 1, wherein the surfactant comprises from 2 to 70% wt. of the composition.

6. A unit-dose tablet composition according to claim 1, further comprising an effervescent selected from carbonate salts selected from sodium carbonate, potassium carbonate, calcium carbonate, sodium bicarbonate, potassium bicarbonate, calcium bicarbonate and magnesium carbonate as well as mixtures thereof.

7. A unit dose tablet composition according to claim 1, further comprising a water-soluble salt.

8. A unit dose tablet composition according to claim 7 wherein the water-soluble salt has a solubility in distilled water of in the range of 0.5 g/100 mL to 75 g/100 mL at 25° C.

9. A unit dose tablet composition according to claim 7, comprising 0.5 to 20 wt. % water soluble salt.

10. A unit dose tablet composition according to claim 1, wherein the triglyceride oil comprises from 5 to 35% wt. of the coated effervescent agent.

11. A method of cleaning a surface comprising the steps of dissolving a unit-dose tablet composition according to claim 1 in water to provide a solution of the cleaning composition and contacting a surface with the cleaning composition.

* * * * *